March 26, 1957 E. D. O'BRIEN ET AL 2,786,388
PRINTING PROCESS
Filed July 15, 1953 4 Sheets-Sheet 1
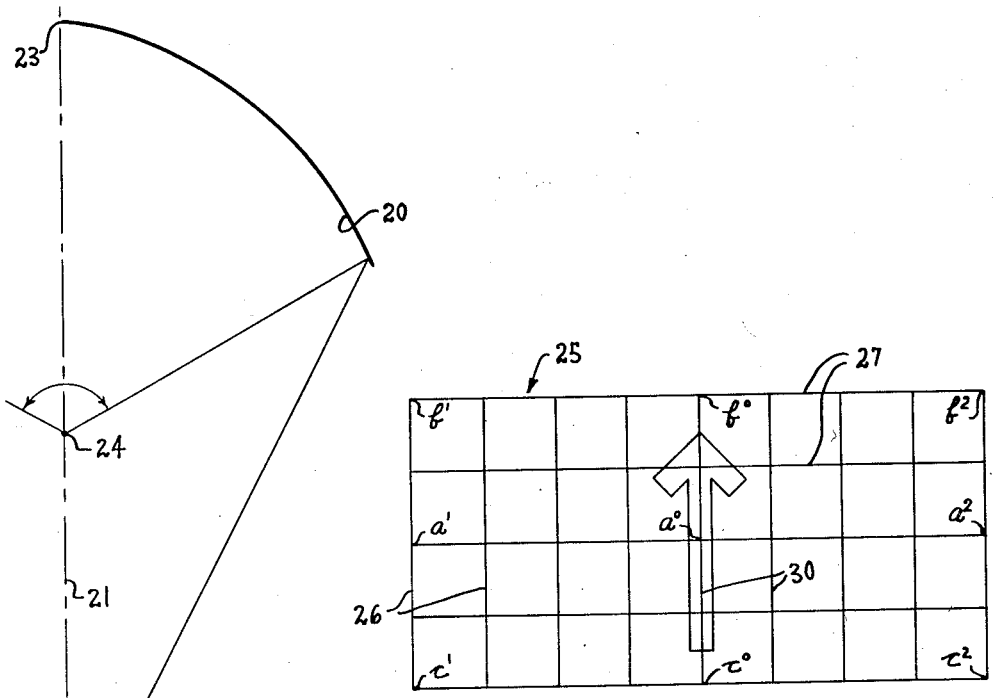
Fig. 1
Fig. 2
Fig. 3
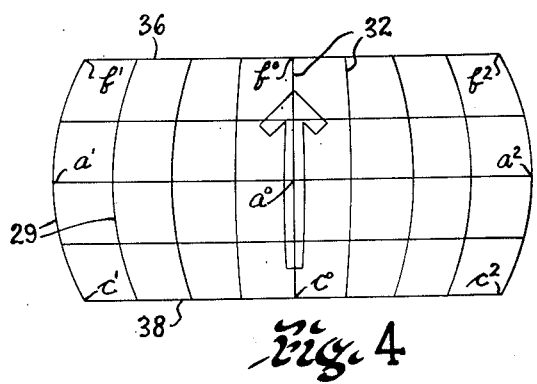
Fig. 4
INVENTORS
ETHEL D. O'BRIEN
BRIAN O'BRIEN
BY
ATTORNEYS

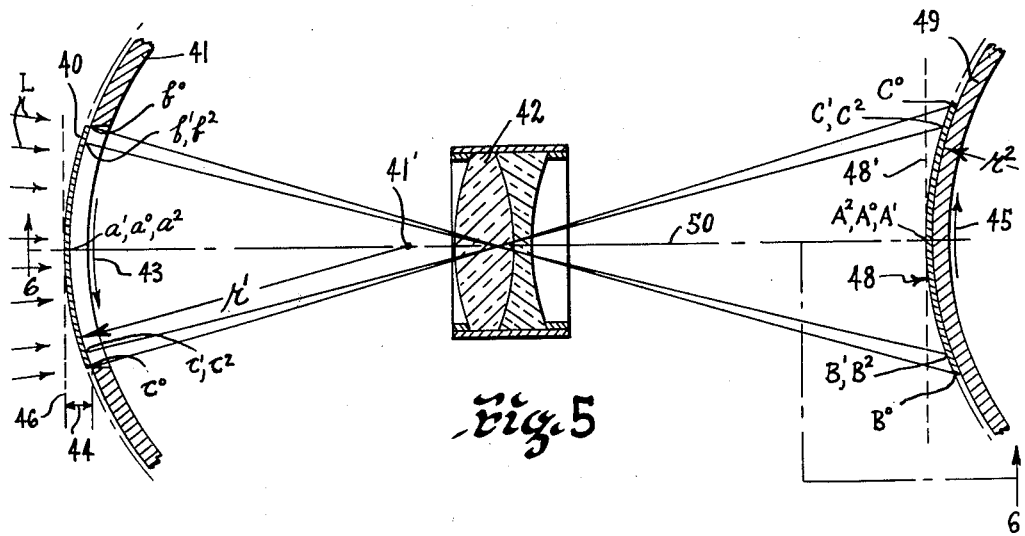
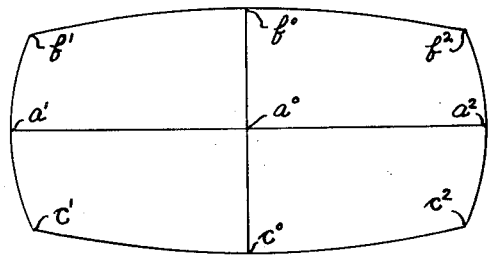
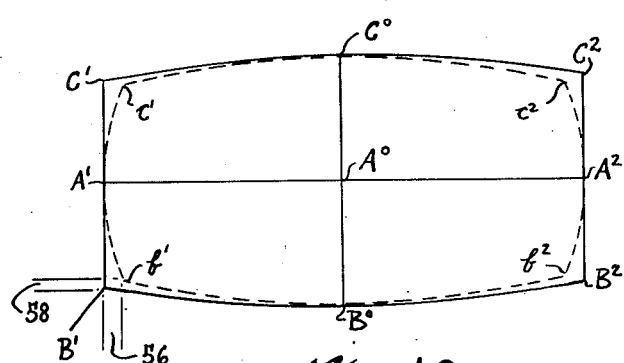

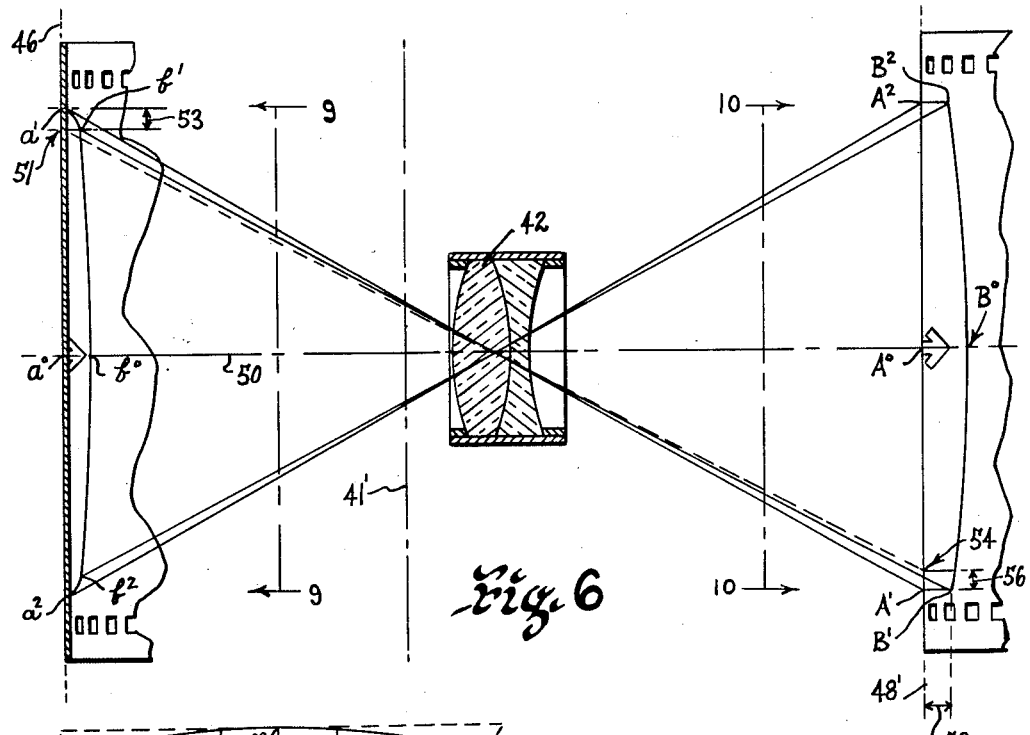
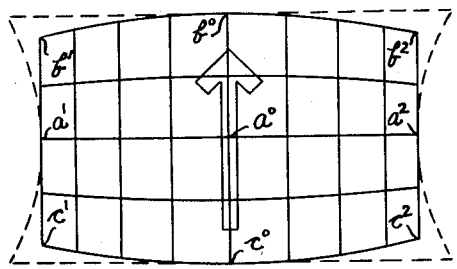
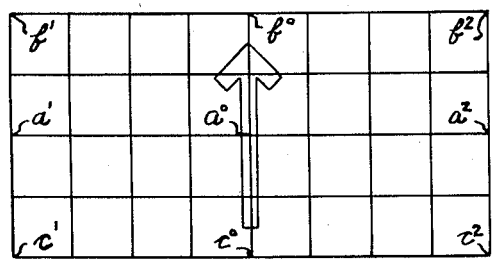
INVENTORS
ETHEL D. O'BRIEN
BRIAN O'BRIEN
ATTORNEYS

United States Patent Office 2,786,388
Patented Mar. 26, 1957

2,786,388
PRINTING PROCESS

Ethel D. O'Brien and Brian O'Brien, Pomfret, Conn., assignors to American Optical Company, Southbridge, Mass., a voluntary association of Massachusetts Application July 15, 1953, Serial No. 368,114

7 Claims. (Cl. 88—24)

This invention relates to a novel photographic printing process and more particularly to such a process arranged to modify at least certain characteristics of picture images recorded by a camera or the like, such as marginal distortional image characteristics of a film image or modify the magnification of a certain part or parts of the picture differently relative to other parts thereof in the picture being reproduced by the process. The photographic process has particular utility in connection with wide angle photographing and projecting systems as will appear hereinafter.

In a photographing and projecting system of the type disclosed in copending O'Brien application, Serial No. 346,953, filed April 6, 1953, wide angle pictures are photographed by a camera lens system having predetermined controlled amounts of distortion therein and of such values that when such distorted photographic film images are subsequently projected through a conventional projection lens system a predetermined distance onto a wide angle cylindrically curved viewing screen of carefully controlled configuration, the picture images upon the screen, as seen by a person centrally seated in front of the screen and substantially at what may be termed the center of perspective of the theater, will have nearly all of the distortion of the picture removed by the co-operating corrective characteristics of said screen.

It has been found, however, that in such a wide angle camera and projection system while most of the introduced distortion in the originally photographed picture may be removed during its subsequent projection, nevertheless at certain times and under certain conditions objects within such a wide angle picture as seen on the screen will manifest small amounts of distortion, particularly near the opposite upper and lower corners thereof and further image modification or rectification is desirable. Furthermore, it has been found that suitable amounts of such modification or rectification of the image by a copying technique as described herein may be used to provide upon such a curved viewing screen pictures which will appear substantially free from distortion when viewed from said central location; the optical center of the theater or the center of perspective of the theater as used herein is intended to mean the approximate apex of the wide angle which the viewing screen subtends and in in the present instance may be as much as 120° or more and is the approximate point at which the camera lens was in effect located during the photographing of the picture.

Conditions which have been found to more readily disclose such slight amounts of distortion remaining in the projected screen image of such a system when such a corrective printing process is not employed are, for example, vertically arranged elongated lines or objects near the outer lateral limits of such a wide angle picture. The corner of a tall near-by building, for example, even though located in such an outer lateral area of the projected picture, should appear substantially vertical and without curvature to a person seated near said center of perspective in the theater. Objects of materially lesser vertical length in these outer regions of the screen picture will not readily disclose such slight errors of distortion even though it may be that such distortion is present in the picture.

In order to provide wide angle projected picture images upon a curved viewing screen of the type referred to above with as much freedom from distortion as possible, the present invention provides a novel printing process arranged to function with and rectify in a controlled manner certain of the distortional characteristics of the recorded camera image, with the results that such pictures upon the viewing screen as displayed to persons near the center of perspective of the theater will appear to be substantially completely free from said distortion.

It is, accordingly, an object of the present invention to provide a photographic printing process whereby errors of distortion in the outer marginal areas of a wide angle photographich image of the type referred to above may be modified or rectified to such an extent that the screen image thereof will appear substantially distortion-free to persons in front of the wide angle viewing screen and substantially at the center of perspective of the theater.

It is another object of the invention to provide a photographic printing process which will provide, when desired, image modification in such a manner as the introduction of distortion into an otherwise substantially distortion-free picture image or into a partially distorted picture image additional distortion of controlled amounts.

It is an additional object to provide in conjunction with such a printing process a modification thereof whereby "keystone" conditions which appear in an originally photographed picture may be eliminated or modified, and conversely to provide a modification of the process whereby a condition of "keystone," when desired, may be introduced into the picture being copied.

Other objects and advantages of the invention will become apparent from the detailed description which follows when taken in conjunction with the accompanying drawings in which:

Fig. 1 is a diagrammatic plan view of a wide angle projection system employing a curved viewing screen of controlled cylindrical curvature and having a predetermined projection distance;

Fig. 2 is a front view of a pattern which is employed to aid in a clear understanding of the basic principles embodying the invention;

Fig. 3 is a front view of a frame of a photographic film showing an image of the pattern, Fig. 2, as produced by the wide angle camera providing controlled distortional characteristics therein;

Fig. 4 is a front view of the film image of Fig. 2 as produced on the viewing screen and as seen by an observer located in the optical center or center of perspective of the theater; said view exaggerating the distortion which would be observed from said location;

Fig. 5 is a diagrammatic side elevational view of printing apparatus which may be used for modification or rectification of the distortion-containing camera picture image of Fig. 3;

Fig. 6 is a longitudinal sectional view taken substantially on line 6—6 of Fig. 5 looking in the direction of the arrows;

Fig. 7 is a front view of a film image of said pattern appearing upon a second film and as rectified by the printing process and the apparatus of Fig. 5;

Fig. 8 is a front view of the distortion corrected image as produced on the viewing screen of Fig. 1 by projection of the second film image of Fig. 7 and as viewed by the observer near said central location;

Figure 11:
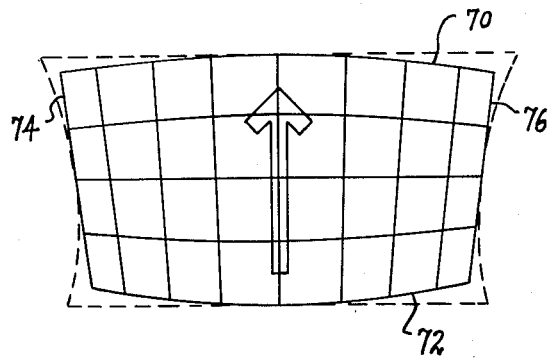
Figure 12:
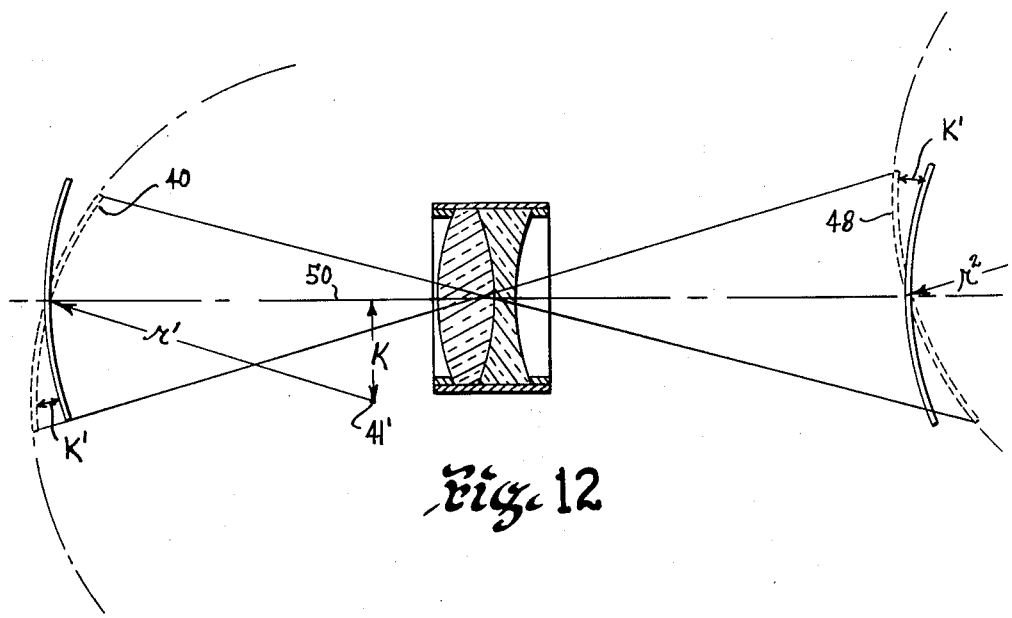

Figs. 9 and 10 are diagrammatic views of the first and second films viewing in the directions of the arrows 9—9 and 10—10 respectively;

Fig. 11 is a view somewhat similar to Fig. 7 and diagrammatically illustrating a keystoning condition which may be introduced into picture image on the second film, by following the teachings of the invention; and, Fig. 12 is a diagrammatic view showing printing apparatus much like that of Fig. 5, but modified to provide a control for keystone effect of Fig. 11 when desired, and used to effect an increase in or a lessening of keystone effects during printing of the second film image.

Referring to the drawings in detail and particularly to Fig. 1, it will be seen that there is diagrammatically illustrated a plan view of a theater employing a wide angle projection screen 20 (only approximately one-half of which is shown) of predetermined cylindrical curvature in the horizontal direction and having a projection axis 21. As taught in the above-mentioned O'Brien application, a projector (not shown), well corrected for distortion, color and other aberrations, may be disposed at a projection point 22 on said projection axis 21, which axis extends substantially normal to the approximate center 23 of the screen considered both vertically and horizontally, and a picture image having carefully controlled distortional characteristics projected thereby along axis 21 and onto this viewing screen, and if the projection distance thereof, as well as the curvature of screen 20, are of proper values, a nearly distortion free image may be seen thereon by a person seated in the audience area near the center of perspective of the theater, as indicated at 24.

To aid in a clear understanding of the basic principles of the present invention, a pattern 25 is shown in Fig. 2. This pattern comprises a plurality of adjacent squares formed by spaced vertical and horizontal lines 26 and 27 respectively. If this pattern is photographed using a distortion introducing wide angle camera lens as described in said O'Brien application a distorted picture image on film will be obtained as shown at 28 by Fig. 3.

Using a projection system such as shown in Fig. 1 and with the film image 28 having controlled distortional characteristics embodied therein as diagrammatically illustrated in Fig. 3, the projected image upon the screen 20 as seen by the observer located generally near point 24 will constitute a wide angle picture much like that diagrammatically illustrated in Fig. 4. Here it should be clearly noted that film sizes, image proportions, screen dimensions as represented in the instant disclosure are only to aid in an explanation and understanding of the invention, and are not intended to represent actual sizes and proportions which may be encountered and may, in fact, vary appreciably therefrom.

The original pattern in Fig. 2 has its horizontal meridian designated by points $a^1$, $a^0$ and $a^2$, has its upper edge designated by points $b^1$, $b^0$ and $b^2$ and has its lower edge designated by points $c^1$, $c^0$ and $c^2$. The vertical meridian of the pattern therefor contains points $b^0$, $a^0$ and $c^0$, the left hand marginal edge contains points $b^1$, $a^1$ and $c^1$ and the right hand marginal edge contains points $b^2$, $a^2$ and $c^2$. It is to be noted in Fig. 3 however, that the film image 28 as photographed by the camera has its upper and lower corner or marginal points $b^1$, $b^2$, $c^1$ and $c^2$ displaced inwardly relative to central or meridional points $a^1$, $a^2$, $b^0$ and $c^0$. As seen on the screen 20 by an observer near point 24, however, upper and lower marginal points $b^1$, $b^2$ and $c^1$, $c^2$ would appear to be displaced only laterally inwardly with respect to central marginal points $a^1$, $a^2$. It is the rectification of these upper and lower corner portions of the picture, such as points $b^1$, $b^2$, $c^1$, $c^2$ with respect to axis $a^1$, $a^0$, $a^2$, that is to be corrected by the method of the present invention.

In the pattern shown by Fig. 2, however, it will be noted that vertical lines 26 near the outer edge of the pattern have been purposely taken as straight lines. In the projected screen image, however, these lines will appear to the observer at 24 as curved lines 29 (see Fig. 4). The more nearly centrally located lines 30 of Fig. 2, however, will appear substantially unchanged to the observer, indicated at 32 in Fig. 4. When vertical lateral marginal lines of a picture are of considerable length, for example the corner of a building or telephone pole in the foreground of the picture, errors of curvature thereof although slight, may be readily noticed by a critical observer. Of course, if the marginal objects in the picture are smaller or further away from the camera taking the picture the vertical lines thereof will be of much shorter length and thus such errors of curvature, although present in the picture, might go unnoticed.

While the photographed image obtained by the distortion introducing camera lens, as shown in Fig. 3, has some curvature in the outer most horizontal lines thereof such as upper and lower lines 34 and 35, to the observer located in the audience area near point 24 these lines will appear upon the viewing screen 20 as substantially straight lines, as indicated at 36 and 38 in Fig. 4. This result will be obtained provided that the observer's position in the audience area is fairly close to the projection axis 21, that is not too far below or above said projection axis.

In order that errors of distortion in the outer lateral marginal areas of the wide angle picture may be corrected or modified to such an extent that extended vertical lines will look correct to the observer seated in the audience area generally near the point 24 during projection of the pictures, a novel printing process is employed and suitable printing apparatus is provided therefor. The printing apparatus comprises, as best seen by Fig. 5, a first or negative strip film 40 having individual frames or picture areas thereon and with each picture portion or area thereof having a picture image provided with controlled amounts of distortion therein resulting from the distortional characteristics of the camera and camera lens system employed for taking said picture.

The resulting distortional characteristics upon the first film 40 are diagrammatically illustrated in the portion of film shown in Fig. 3, wherein the grill-like framework of the original pattern (see Fig. 2) having equal size squares, appears noticeably distorted. The individual squares spaced from the center of the picture are distorted from their original shape particularly the ones in the areas nearest the outer lateral limits of the photographed pattern. The film 40 is positioned and held in the printing apparatus in a cylindrically curved position by suitably curved apertured gate means 41 so that this part of the film will curve at a predetermined radius $r^1$ about a transverse axis 41' in a desired manner relative to a photographic printing objective 42 and with the concave side of the film 40 facing the objective. The film 40 at this time is cylindrically curved lengthwise of the film and so that the top and bottom edges of the photographed picture are drawn inwardly towards the objective appreciable controlled amounts, depending upon the amounts of distortion introduced by the camera taking the original distorted negative and the amount and kind of distortion needed in certain outer component portions of the picture for correction. The arrow 43 indicates the longitudinal direction of the film strip and thus the direction in which the film will be intermittently moved between copying of individual frames.

The amount which the first film 40 is bent forwardly for copying purposes is represented in Fig. 5 by dimension 44, the outer edge of the frame being displaced from a flat plane 46 by this amount. A second (sensitized) film on which the picture image is to be projected and copied in modified or rectified form is indicated at 48 and in the preferred embodiment shown in Figs. 5 and 6 is located substantially at a 1 to 1 conjugate relative to said objective and the first film 40. (Other conjugates, such as 1 to 2 or 2 to 1 could as readily be used, if desired.) The second film 48 is also cylindrically curved out of a flat plane indicated by dotted line 48' in a controlled manner about a transverse axis (not shown) substantially parallel to the axis 41', the radius thereof being indicated by $r^2$. In the present instance $r^2$ has been taken as substantially equal to $r^1$. A suitably curved support 49 of the printing apparatus is provided so that the curvature of the film 48 will be maintained and in convex relation with reference to the objective 42. Thus the strip film 48 is also arranged to extend and be moved intermittently between exposures generally in the same plane (but opposite direction) as the first film 40 as indicated by arrow 45. The objective 42 is preferably a high speed copying lens system well corrected for the usual aberrations and of a type having fairly flat object and image fields. The illumination is indicated by the arrows L.

The second film 48 will be convexly curved (see Fig. 5) so that the top and bottom edges of the frame thereof aligned with the objective 42 will lie further away from the objective than the transverse center line of the frame. However the arrangement is such that a proper focus of image of the first film picture upon the second film will be maintained notwithstanding such film curvatures. Thus it will be seen in Fig. 5 that the transversely disposed points along the central meridional line of the frame of film 48 represented by points $a^1$, $a^0$, $a^2$ (see also Fig. 9) will be correctly imaged upon the film 48 by the objective 42 at points $A^1$, $A^0$, $A^2$ (see also Fig. 10), notwithstanding the fact that the first film 40 has its outer edges, top and bottom, curved inwardly towards the objective 42 appreciable controlled amounts. Furthermore, the points $b^1$, $b^0$ and $b^2$ along the top of the frame of the first film will be properly focused upon the second film at $B^1$, $B^0$ and $B^2$. Likewise the first film points $c^1$, $c^0$ and $c^2$ adjacent the bottom edge will be properly focused upon the second film 48 at points $C^1$, $C^0$ and $C^2$. The reason for such an advantageous condition is that even though the film 40 has its outer upper and lower edges pulled in appreciably, such action shifts the conjugate image points thereof accordingly and thereby creates a cylindrically curved image field, which in the present instance is the curvature desired in the second or positive film 48 for rectification of predetermined component portions of the picture image being formed.

The image rectification or modification created by this curving of the first or negative film 40 and the corresponding curving of the second or positive film 48 during exposure of the latter will be readily understood from the following discussion and reference to Figs. 5 and 6. While the points $a^1$, $a^0$ and $a^2$ upon the central transverse meridional line of the frame of the film 40 remain stationary (that is they are not displaced by the bending of the film), the upper points $b^1$, $b^0$ and $b^2$ and the lower points $c^1$, $c^0$ and $c^2$ for example will be swung inwardly from plane 46 toward the axis 41' of the cylindrical film gate 41 and generally toward the objective 42 as viewed in Fig. 5. However, as seen in Fig. 6 corner points $b^1$, $b^2$, $c^1$ and $c^2$ travel in planes substantially parallel to the optical axis 50 of the printing apparatus as they are swung inwardly from plane 46 toward axis 41', thereby occupying new positions having different angular relation with respect to the objective 42, while upper and lower central points $b^0$ and $c^0$ are displaced in a plane containing the optical axis 50 and thus do not appreciably change their angular relation relative to objective 42.

The point $b^1$, for example, in Fig. 6 moves forwardly from point 51 in plane 46 during bending of the film to its new position as shown, and in so doing changes its angular relation relative to the objective. Its distance from the side of the frame, indicated by numeral 53 has not changed. Upper and lower points $b^1$, $b^0$ and $b^2$ and $c^1$, $c^0$ and $c^2$ are imaged by the objective 42 upon film 48 at points $B^1$, $B^0$ and $B^2$ and $C^1$, $C^0$ and $C^2$ respectively. While upper and lower central points $B^0$ and $C^0$ are in the plane containing the objective 42 and points $b^0$ and $c^0$ and accordingly do not, as viewed in Fig. 6, change their angular relation relative to objective 42, points $B^1$, $B^2$, $C^1$ and $C^2$ do.

Point $B^1$, for example, due to the bent condition of film 48 will be displaced from point 54 in plane 48' rearwardly (or parallel to axis 50) an amount indicated by the numeral 52. This displacement 52 in turn produces a lateral displacement of image point $B^1$ by an amount indicated by numeral 56. Thus the desired amount of change in distortion or rectification of image will be provided upon the positive sensitized film 48.

Figs. 9 and 10 are provided for convenience in showing the pattern as it would appear upon the first film 40 (Figs. 5 and 6) and upon the second film 48 respectively. This angular displacing (indicated by numerals 52 and 56) of the outer corner points of the picture being reprinted upon film 48 has the effect, as shown by dotted lines in Fig. 10, of displacing the points $b^1$, $b^2$, $c^1$ and $c^2$ to new locations, $B^1$, $B^2$, $C^1$ and $C^2$ away from meridional line $B^0$, $A^0$, $C^0$ an amount indicated at 56 and away from meridional line $A^1$, $A^0$ and $A^2$ an amount indicated at 58. This rectification thus keeps the magnification of picture along the meridional lines $A^1$, $A^0$, $A^2$ and $B^0$, $A^0$, $C^0$ substantially constant while magnification near the top and bottom outer corners of the picture is increased, thereby effecting a straightening up of elongated vertical lines of buildings, objects etc. as previously referred to near the outer lateral marginal portions of the picture image upon the theater viewing screen 20 as viewed by an observer, in the region near point 24, as illustrated in Fig. 8.

While the preceding description is concerned with the correction or rectification of vertical lines near the opposite sides of a wide angle picture, it might be, in some instances, desirable to modify the picture at the same time to either compensate for conditions of "keystoning" or introduce into the picture a keystoning effect and this may be done in the manner diagrammatically illustrated in Fig. 12, and a modified picture resulting therefrom is presented in Fig. 11. Here it will be noted that the top and bottom lines 70 and 72, respectively, are of different lengths and that lateral marginal lines 74 and 76 are nevertheless maintained in their rectified (straightened) condition. The keystoning effects just referred to may be brought about by changing the related angularity K' of the first or negative film 40 and of the second or positive film 48 relative to optical axis 50 of the objective 42 prior to the printing process. This angular displacement for the negative film 40 is indicated by the length of the arrow K extending from optical axis 50 to the cylindrical axis 41'. The angular displacement of the positive film 48, while not shown, is preferably substantially equal to the value indicated by the letter K, but is taken upon the opposite side of the optical axis 50. Of course, for different amounts of keystoning rectification or introduction, the displacement value K may be increased or decreased. Since this angling of the positive and negative films is equal and opposite, all parts of the image being copied on the film 48 will be in proper focus.

In previously describing the curving of the film gate 41 and curved support 49 for the first and second films, respectively, it was stated that equal predetermined radii of curvatures ($r^1$, $r^2$) were preferably used and that the first and second films would be arranged at predetermined conjugates. It should here be noted, however, that change of conjugates being used will effect an over all change in magnification of the picture being copied. A change in the radii for the gate 41 and for the support 49, on the other hand, may be used to control, over a fairly wide range, the amount of rectification being given to the sides of the picture image being formed on the second film 48.

Although the above description is directed primarily to the correction of distortion or curvature of the side marginal edge portions of the screen image, it has been mentioned that the upper and lower edges of the film picture as shown in Fig. 3 curve downwardly and upwardly, respectively. However, if this film picture is projected onto a curved screen and is viewed by an observer seated near the optical center or center of perspective of the theater, these upper and lower edges will appear straight.

When viewed by an individual seated rearwardly of the optical center or center of perspective of the theater these upper and lower edges of the picture will appear to be curved and in such instances, it might be desirable to alter these edges in the film image to reduce or obviate such curving of the observed screen image. This may be accomplished in a manner similar to that described for the correction of the side edges of the film picture but would require the additional step of bending the films in a direction transversely thereof or at right angles to the first described direction of bending and then completing the process. Thus the films will traverse a suitably curved gate and curved support at right angles to the direction of travel of the first described printing process. The radii of curvatures of the gate and support may, of course, be appreciably different than that required for said first described process. The curvatures therefore are controlled to the extent of straightening said upper and lower edges or to reduce the curvatures thereof predetermined amounts as desired and according to the position of viewing of the observer. However, this will introduce no change in the previously described correction of the vertical lines. The process is otherwise similar to that previously described.

While in the foregoing description relating to the straightening of the curved vertical lines at the lateral marginal edges of the picture has been discussed with particular reference as to the view of the observer located at the approximate center of perspective 24, it should be understood that when said lines have been straightened as heretofore described they will appear straight not only to that observer but also to observers at all other locations in the audience area.

Having described our invention we claim:

1. The method of transferring by projection printing a photographic picture image from a first film to a second film having light-sensitive means thereon and simultaneously altering by predetermined amounts selected marginal component portions of the picture image being formed on said second film, the picture image on said first film being of appreciable height and width and having predetermined progressively increasing amounts of inward radial distortion in parts thereof at opposite sides of its vertical meridian, considered from said vertical meridian outwardly towards the opposite side edges thereof, whereby elongated objects in said first picture image laterally removed from said meridian and disposed in generally vertical directions will exhibit progressively increasing amounts of inward curvature at locations above and below the horizontal meridian thereof, said method comprising cylindrically curving said first film picture image by a controlled amount and supporting same with said cylindrically curved film image in front of an objective and with its horizontal meridian at a first predetermined axial distance therefrom, and with the concave side of said first film facing said objective so as to cause the upper and lower edge portions of said first picture image exhibiting objects having said inward curvatures to be displaced appreciable given amounts toward said objective, cylindrically curving and supporting said second film with the convex side thereof aligned with and facing the opposite side of said objective, and at such an axial distance from said objective as to be conjugate to said first axial distance, and with the cylindrical curvature of said second film being so controlled according to the curvature of said first film as to cause the light rays transferring the photographic image from said first film to said second film to impinge upon said second film and cause outer component portions of said second image spaced from the horizontal and vertical meridians thereof to be elongated, the elongations in said outer portions being of progressively increasing amounts, considered from the vertical meridian thereof outwardly, said last-named amounts being sufficient to substantially rectify said inward curvatures in objects in the image being produced on said second film, simultaneously illuminating all parts of the film image on said first film while in stationary relation to said objective and relative to said second film, and thereafter subjecting the exposed second film to a photographic developing process.

2. The method of transferring by projection printing a photographic picture image from a first film to a second film having light-sensitive means thereon and simultaneously altering by predetermined amounts selected marginal component portions of the picture image being formed on said second film, the picture image on said first film being of appreciable height and width and having predetermined progressively increasing amounts of inward radial distortion in parts thereof at opposite sides of its vertical meridian, considered from said vertical meridian outwardly towards the opposite side edges thereof, whereby elongated objects in said first picture image laterally removed from said meridian and disposed in generally vertical directions will exhibit progressively increasing amounts of inward curvature at locations above and below the horizontal meridian thereof, said method comprising cylindrically curving said first film picture image by a controlled amount and supporting the same with said cylindrically curved film image in front of an objective and with its horizontal meridian at a first predetermined axial distance therefrom, and with the concave side of said first film facing said objective so as to cause the upper and lower edge portions of said first picture image exhibiting objects having said inward curvatures to be displaced appreciable given amounts toward said objective, cylindrically curving and supporting said second film with the convex side thereof aligned with and facing the opposite side of said objective, and at such an axial distance from said objective as to be conjugate to said first axial distance, and with the cylindrical curvature of said second film being so controlled according to the curvature of said first film as to cause the light rays transferring the photographic image from said first film to said second film to impinge upon said second film and cause outer component portions of said second image spaced from the horizontal and vertical meridians thereof to be elongated while the positional relationship of objects along the horizontal meridian of the second image relative to the positional relationship of same along the horizontal meridian of the first image remains unchanged, the elongations in said outer portions being of progressively increasing amounts, considered from the vertical meridian thereof outwardly, said last-named amounts being sufficient to substantially rectify said inward curvatures in objects in the image being produced on said second film, simultaneously illuminating all parts of the film image on said first film while in stationary relation to said objective and relative to said second film, and thereafter subjecting the exposed second film to a photographic developing process.

3. The method of transferring by projection printing a photographic picture image from a first film to a second film having light-sensitive means thereon and simultaneously altering by predetermined amounts selected marginal component portions of the picture image being formed on said second film, the picture image on said first film being of appreciable height and width and having predetermined progressively increasing amounts of inward radial distortion in parts thereof at opposite sides of and spaced from both its vertical and horizontal meridians, considered from said meridians outwardly towards the opposite side edge portions and toward the top and bottom edge portions respectively, whereby elongated objects in said first picture image laterally removed from said vertical meridian and vertically removed from said horizontal meridian will exhibit progressively increasing amounts of inward curvature which vary as the distances from said meridians respectively vary, said method comprising cylindrically curving said first film picture image by a controlled amount and supporting same with said cylindrically curved film image in front of an objective and with its horizontal meridian at a first predetermined axial distance therefrom, and with the concave side of said first film facing said objective so as to cause the upper and lower edge portions of said first picture image exhibiting objects having said inward curvatures to be displaced given amounts toward said objective, cylindrically curving and supporting said second film with the convex side thereof aligned with and facing the opposite side of said objective, and at such an axial distance from said objective as to be conjugate to said first axial distance, and with the cylindrical curvature of said second film being so controlled according to the curvature of said first film as to cause the light rays transferring the photographic image from said first film to said second film to impinge upon said second film and cause outer component portions of said second image spaced from said horizontal and vertical meridians to be generally radially elongated, the elongations in said outer portions being of progressively increasing amounts and sufficient to substantially rectify said inward curvatures in objects in the image being produced on said second film, simultaneously illuminating all parts of the film image on said first film while in stationary relation to said objective and relative to said second film, and thereafter subjecting the exposed second film to a photographic developing process.

4. The method of transferring by projection printing a photographic picture image from a first film to a second film having light-sensitive means thereon and simultaneously altering by predetermined amounts selected marginal component portions of the picture image being formed on said second film to compensate for radial distortion and keystone condition therein, the picture image on said first film being of appreciable height and width and having predetermined progressively increasing amounts of inward radial distortion in parts thereof at opposite sides of its vertical meridian, considered from said vertical meridian outwardly towards the opposite side edges thereof, whereby elongated objects in said first picture image laterally removed from said meridian and disposed in generally vertical directions will exhibit progressively increasing amounts of inward curvature at locations above and below the horizontal meridian thereof, and appreciable amounts of keystone condition are apparent therein, said method comprising cylindrically curving said first film picture image by a controlled amount and supporting same with said cylindrically curved film image in front of an objective and with its horizontal meridian at a first predetermined axial distance therefrom, and with the concave side of said first film facing said objective so as to cause the upper and lower edge portions of said first picture image exhibiting objects having said inward curvatures to be displaced appreciable given amounts toward said objective, cylindrically curving and supporting said second film with the convex side thereof aligned with and facing the opposite side of said objective, and at such an axial distance from said objective as to be conjugate to said first axial distance, the axes of curvature of said first film and of said second film being parallel to each other and also displaced respectively substantially equal predetermined angular amounts to opposite sides of the axis of said objective, the cylindrical curvature of said second film being so controlled according to the curvature of said first film as to cause the light rays transferring the photographic image from said first film to said second film to impinge upon said second film and cause outer component portions of said second image spaced from the horizontal and vertical meridians thereof to be elongated, the elongations in said outer portions being of progressively increasing amounts, considered from the vertical meridian thereof outwardly, said last-named amounts and said predetermined angular amounts being sufficient to substantially rectify said inward curvatures in objects in the image being produced on said second film and to substantially compensate for said keystone condition, simultaneously illuminating all parts of the film image on said first film while in stationary relation to said objective and relative to said second film, and thereafter subjecting the exposed second film to a photographic developing process.

5. The method of transferring by projection printing a photographic picture image from a first film to a second film having light-sensitive means thereon and simultaneously altering by predetermined amounts selected marginal component portions of the picture image being formed on said second film, the picture image on said first film being of appreciable height and width and having predetermined progressively increasing amounts of inward radial distortion in parts thereof at opposite sides of its vertical meridian, considered from said vertical meridian outwardly towards the opposite side edges thereof, whereby elongated objects in said first picture image laterally removed from said meridian and disposed in generally vertical directions will exhibit progressively increasing amounts of inward curvature at locations above and below the horizontal meridian thereof, said method comprising supporting said first film with the vertical meridian of the picture image thereon in a cylindrically curved position in front of an objective, and with the center of said first film picture image at a first predetermined axial distance relative thereto, and with the top and bottom edge portions of said first film picture image displaced toward said objective so as to have the concave side thereof facing said objective, the radius of curvature of the cylindrical portion of said first film being of a materially lesser dimension than the dimension of said first predetermined axial distance, supporting said second film so that a portion thereof is disposed in a cylindrically curved position of predetermined radius at the opposite side of said objective, and such an axial distance from said objective as to be conjugate to said first axial distance, and with the parts of said curved portion of said second film which are to receive the top and bottom edge portions of the picture image being projected from said first film being displaced away from said objective so that the convex side of the cylindrical portion of said second film will face said objective, and with the axes of curvature of both films being parallel, the radius of curvature of said second film being of such a value relative to the radius of curvature of said first film and the axial distances of said films from said objective as to cause vertically arranged parts of objects in the originally photographed scene when transferred from said first film to said second film to appear upright thereon, simultaneously illuminating all parts of said first picture image while in stationary relation to said objective and in stationary relation to said second film, and thereafter subjecting the exposed second film to a developing process, whereby inward radial distortional characteristics which appear in said first film image adjacent marginal component portions thereof will be substantially removed from the picture image formed upon said second film.

6. A photographic film having a picture image of appreciable height and width recorded thereon, said film image being adapted to be subsequently projected onto a horizontally concavely curved viewing screen of predetermined curvature from a predetermined projection position appreciably rearwardly of a preselected point in the audience area approximating the point about which the surface shape of the screen is generated, said film image being free from distortion at the center thereof and possessing in component portions thereof, considered along its center line disposed in a direction generally horizontally of said image from said center to the opposite side edges respectively thereof, inward radial distortional characteristics of values which progressively increase as their distances, respectively, from the center of said image increase, said film image also having in component portions thereof in directions spaced vertically from said center line distortional characteristics which are, when considered in a direction generally paralleling said center line of said image, proportionately similar to said progressively increasing distortional characteristics of corresponding components along said center line, whereby when said image is projected onto said concavely curved viewing screen from said predetermined projection position a screen image will be displayed thereon which will appear to persons centrally located in an audience area generally intermediate said projection position and said screen to be well corrected for distortion.

7. A photographic film having a picture image of appreciable height and width recorded thereon, said film image being adapted to be subsequently projected onto a horizontally concavely curved viewing screen of predetermined curvature from a predetermined projection position which is vertically spaced from a line normal to the center of said screen and which is at least twice as far from the center of said screen as is the approximate center of curvature of said screen, said film image being free from distortion at the center thereof and possessing in component portions thereof, considered along the transverse meridian of said image from said center to the opposite side edges respectively thereof, inward radial distortional characteristics of values which progressively increase as their distances, respectively, from the center of said image increase, said film image also having in component portions thereof spaced vertically from said transverse meridian a predetermined amount of keystone effect as well as distortional characteristics which are otherwise, when considered in the transverse direction of said image, substantially similar to said progressively increasing distortional characteristics of corresponding components along said transverse meridian, whereby objects in said film image will appear upright even though a keystone condition is present therein, and when said image is projected onto said concavely curved viewing screen from said predetermined projection position with the transverse meridian thereof disposed in generally parallel relation to the horizontal center line of said screen a screen image will be displayed thereon which will appear, to persons centrally located in an audience area generally intermediate said projection position and said screen, to be well corrected for distortion and substantially free from keystone effect.

References Cited in the file of this patent

UNITED STATES PATENTS

| | | |
|---|---|---|
| 1,912,661 | Seymour | June 6, 1933 |
| 1,964,834 | Thun | July 3, 1934 |
| 2,081,187 | Stuart | May 25, 1937 |
| 2,118,894 | Morrissey | May 31, 1938 |

FOREIGN PATENTS

| | | |
|---|---|---|
| 325,846 | Germany | Sept. 21, 1920 |
| 682,432 | Germany | Oct. 14, 1939 |